US006882846B1

(12) United States Patent
O'Byrne

(10) Patent No.: US 6,882,846 B1
(45) Date of Patent: *Apr. 19, 2005

(54) SYSTEM AND METHOD FOR INCREASING CDMA CAPACITY BY FREQUENCY ASSIGNMENT

(75) Inventor: Vincent A. O'Byrne, Brighton, MA (US)

(73) Assignee: Verizon Laboratories Inc., Waltham, MA (US)

( * ) Notice: Subject to any disclaimer, the term of this patent is extended or adjusted under 35 U.S.C. 154(b) by 953 days.

This patent is subject to a terminal disclaimer.

(21) Appl. No.: 09/602,079

(22) Filed: Jun. 22, 2000

Related U.S. Application Data

(63) Continuation of application No. 09/050,680, filed on Mar. 30, 1998, now Pat. No. 6,243,584.

(51) Int. Cl.[7] ................................................. H04Q 7/20
(52) U.S. Cl. ....................... 455/447; 455/450; 370/329; 370/335
(58) Field of Search ................................ 455/447, 450, 455/451, 452.1, 452.2, 453, 62, 63.1, 67.11, 67.13; 370/329, 335

(56) References Cited

U.S. PATENT DOCUMENTS

| | | | | |
|---|---|---|---|---|
| 3,764,915 A | * | 10/1973 | Cox et al. ................. | 455/452.1 |
| 5,642,377 A | | 6/1997 | Chung et al. ............... | 375/200 |
| 5,644,591 A | | 7/1997 | Sutton ........................ | 375/200 |
| 5,649,292 A | * | 7/1997 | Doner ........................ | 455/447 |
| 5,722,043 A | * | 2/1998 | Rappaport et al. ........ | 455/452.1 |
| 5,732,353 A | * | 3/1998 | Haartsen ..................... | 455/450 |
| 5,758,287 A | * | 5/1998 | Lee et al. .................... | 455/450 |
| 5,839,074 A | * | 11/1998 | Plehn ......................... | 455/450 |
| 5,857,143 A | * | 1/1999 | Kataoka ..................... | 455/450 |
| 5,859,841 A | * | 1/1999 | Gitlits ........................ | 370/335 |
| 5,898,928 A | * | 4/1999 | Karlsson et al. ............ | 455/450 |
| 6,243,584 B1 | * | 6/2001 | O'Byrne ..................... | 455/447 |

FOREIGN PATENT DOCUMENTS

WO    WO 94/17640    8/1994    ............ H04Q/7/04

OTHER PUBLICATIONS

Qualcomm, "The CDMA Network Engineering Handbook," vol. 1: Concepts in CDMA, Mar. 1, 1993.
Principles of CDMA, http://www.cdg.org/a_ross/Principles.html, p. 1.
Spreading Codes, http://www.cdg.org/a_ross/Spreading.html, p. 1.
Reverse CDMA Channel, http://www.cdg.org/a_ross/Reverse.html, p. 1–4.
Forward CDMA Channel, http://www.cdg.org/a_ross/Forward.html, p. 1–5.
Introduction to CDMA, http://www.cdg.org/a_ross/Intro.html, p. 1–2.
IS–95 CDMA System issues, http://www.ericsson.se/systems/D–AMPS_1900/19_35_36.html, p. 1–3.
Sivarajan, Kumar N. et al., Channel Assignment in Cellular Radio, CH2379–1/89/0000/0846, IEEE, 1989, p. 846–850.
Plehn, J., Applied Frequency Assignment, 0–7803–1927–3/94, IEEE, 1994, p. 853–857.

* cited by examiner

Primary Examiner—Quochien B. Vuong
(74) Attorney, Agent, or Firm—Leonard C. Suchyta, Esq.; Joel Wall, Esq.

(57) ABSTRACT

A system increases the capacity of a CDMA network having a plurality of cell sites. The system defines a pool of frequencies available for assignment, and assigns one of the available frequencies to each of the cell sites so as to minimize the number of neighboring cell sites assigned a same one of the available frequencies. By deploying different frequencies in the cell sites, the amount of interference caused by neighboring cell sites reduces. As a result, the capacity of each of the cell sites operating at a single frequency can be increased, so long as there remains sufficient power to reach the mobile units operating within the cell site. The system attains maximum benefits when the cell sites are located close together and the propagation exponent is low (for example, 10–20 dB/decade).

11 Claims, 9 Drawing Sheets

SYSTEM AND METHOD FOR INCREASING CDMA CAPACITY BY FREQUENCY ASSIGNMENT

This is a continuation of application Ser. No. 09/050,680, filed Mar. 30, 1998, now U.S. Pat. No. 6,243,584.

FIELD OF THE INVENTION

The present invention relates generally to wireless communications systems and more particularly to a method for increasing the capacity of a Code Division Multiple Access (CDMA) network.

BACKGROUND OF THE INVENTION

A CDMA cellular network is a digital spread spectrum communications system. The CDMA network includes several base stations each providing digital service to mobile units located in different geographical regions. Communication between a mobile unit and a base station in a CDMA network occurs on reverse and forward CDMA channels. The reverse channel is a mobile unit-to-base station direction of communication that carries traffic and signaling information. The forward channel is a base station-to-mobile unit direction of communication that carries pilot, sync, and paging signals in addition to traffic signals.

CDMA networks are deployed differently from analog and other digital networks. CDMA networks are typically deployed with the ability to operate at only one frequency because additional frequencies, though possible, require additional hardware. To increase coverage area, conventional CDMA networks use one common frequency transmission and soft handoff mechanisms. This results in approximately a 3–4 dB advantage in the transmission channel budget, and thus, a larger cell site size for deployment purposes.

Handoffs typically occur when mobile or portable units traverse the cell sites of the network. A "soft handoff" is when the mobile unit begins communication with a new base station on the same CDMA frequency assignment before terminating communication with the old base station. A "hard handoff," on the other hand, is characterized by a temporary disconnection of the mobile unit's Traffic Channel. Hard handoffs occur, for example, when the CDMA frequency assignment changes or when the mobile unit is directed from a CDMA Traffic Channel to an analog voice channel.

The capacity of a CDMA network is a complex function of the handoff condition of the network, the propagation environment, and the loading of the surrounding cell sites. In a typical CDMA network, the capacity on the reverse channel is limited by interference from mobile units operating in other cell sites. This cuts the capacity on the reverse channel by about 30 to 40% in a typical propagation environment with a pathloss exponent of 3.5 to 4. The reduction in capacity on the reverse channel is measured in terms of a frequency reuse factor. FIG. 1 is a graph of the frequency reuse factor as a function of the pathloss exponent in a CDMA network deployed at a single frequency.

In some circumstances, intracell interference significantly reduces the capacity of the CDMA network, especially when the propagation coefficient is very low (i.e., pathloss exponents of 1 or 2, which equates to 10 or 20 dB reductions in signal strength per decade change in distance). In these circumstances, a majority of the signal received at the base station is a result of interference from other cell sites. This limits the capacity of the CDMA network.

The maximum reverse channel capacity, or pole capacity, is a function of many CDMA parameters and can be expressed approximately by $$N = \frac{W}{R} * \frac{1}{\frac{E_b}{N_o}} * \frac{1}{d} * F * G \tag{1}$$

where N represents the number of users, W is the signal bandwidth (e.g., 1.23 MHz), R is the information rate (e.g., 9.6 kbps or 14.4 kbps for Rate Set I or Rate Set II), $E_b/N_o$ is the received signal relative to the noise level (typically 7 dB), d is the voice activity factor, F is the frequency reuse factor (i.e., the ratio of in-band to out-of-band interference), and G is the sectorization gain (e.g., 2.55 for a 120 degree antenna).

A typical set of parameters, where d=40%, R=9.6 kbps, and F=0.6, results in 38 channels per frequency channel (1.23 MHz). CDMA networks typically operate at 50% reverse channel capacity, which means that the network realizes approximately 19 traffic channels per carrier.

The frequency reuse factor (F) is defined as $$F = \frac{\text{Intracell Interference}}{\text{Intracell Interference} + \text{Intercell Interference}} \tag{2}$$

Intracell Interference represents interference caused by mobile units operating within the cell site, and Intercell Interference represents interference caused by mobile units operating within other cell sites. Intercell Interference detracts from the usable capacity of the network, and must be reduced to increase the frequency reuse factor to its theoretical maximum of unity.

Today, CDMA network operators are granted a greater frequency bandwidth than actually used to deploy the CDMA network. However, these operators continue to deploy a single frequency and use the benefits of soft handoffs to improve call quality. Soft handoffs are typically employed for two reasons: (1) to increase coverage, and (2) to improve the handoff process. Where the cell sites are capacity limited, such as in high traffic areas, however, there is a reduced need for the advantages of soft handoff. As a result, the CDMA networks continue to have limited capacity.

Therefore, a need exists to increase the capacity of the CDMA networks deployed at a single frequency.

SUMMARY OF THE INVENTION

Systems and methods consistent with the principles of the present invention address this need by taking advantage of the additional available frequencies and utilizing hard handoff mechanisms to increase the capacity of individual sectors and cell sites.

In accordance with the purpose of the invention as embodied and broadly described herein, the system consistent with the principles of the present invention increases the capacity of a CDMA network having a plurality of cell sites. The system defines a pool of frequencies available for assignment, and assigns one of the available frequencies to each of the cell sites so as to minimize the number of neighboring cell sites assigned a same one of the available frequencies. By deploying different frequencies in the cell sites, the amount of interference caused by neighboring cell sites reduces. As a result, the capacity of each of the cell sites operating at a single frequency can be increased, so long as there remains sufficient power to reach the mobile units operating within the cell site.

BRIEF DESCRIPTION OF THE DRAWINGS

The accompanying drawings, which are incorporated in and constitute a part of this specification, illustrate an embodiment of the invention and, together with the description, explain the objects, advantages, and principles of the invention. In the drawings.

DETAILED DESCRIPTION OF THE PREFERRED EMBODIMENTS

The following detailed description of the invention refers to the accompanying drawings The description includes exemplary embodiments, other embodiments are possible, and changes may be made to the embodiments described without departing from the spirit and scope of the invention. The following detailed description does not limit the invention. Instead, the scope of the invention is defined by the appended claims.

Over the last several years, the hard handoff feature of CDMA has dramatically improved due to the increased need to be able to handoff to other CDMA operators at the borders of the CDMA network, and due to cases where the CDMA network operates at multiple layered frequencies to reduce the interference between newly deployed networks and incumbent microwave operators.

Systems and methods consistent with the principles of the present invention increase the capacity of CDMA networks by deploying adjacent cell sites at different frequencies, and using hard handoff mechanisms between the cell sites, if necessary, as a mobile or portable unit travels across the network.

Figure 2A:
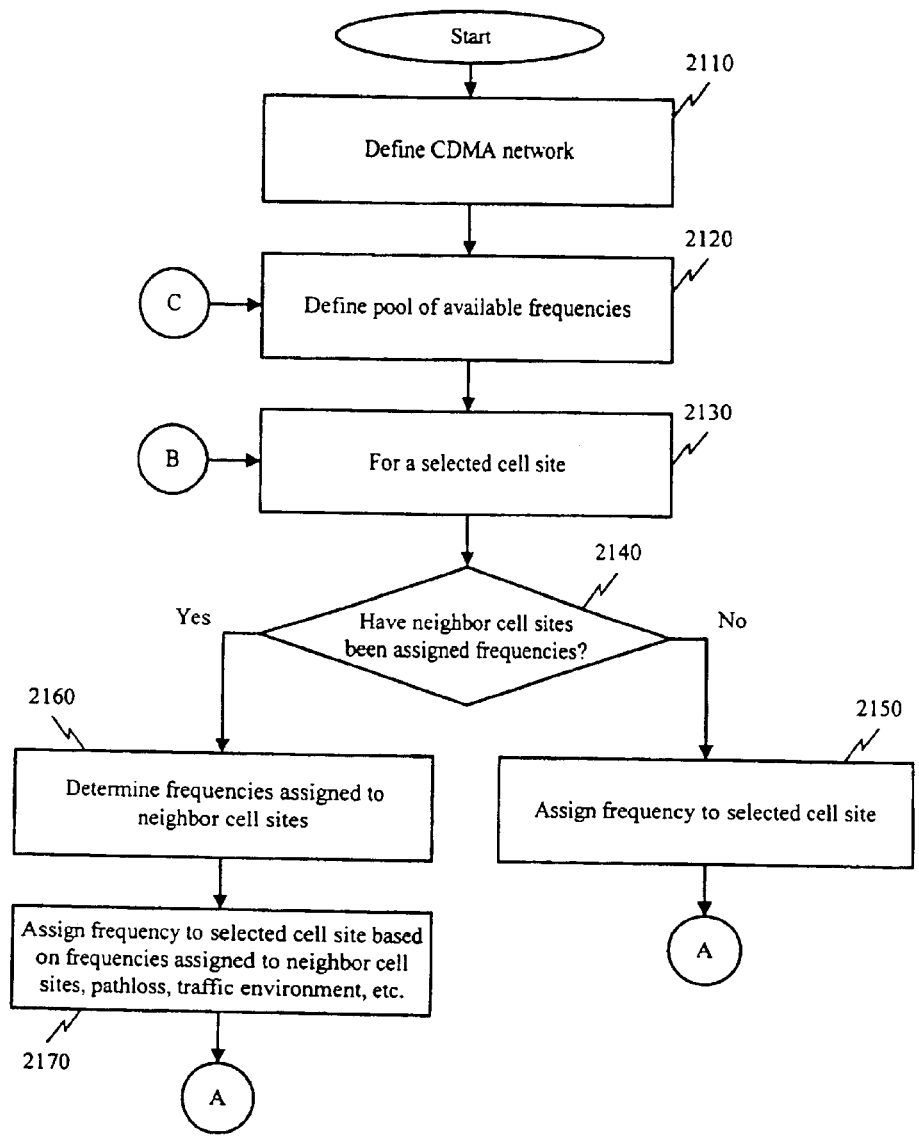
FIGS. 2A and 2B are a flowchart of a method of increasing the capacity of a CDMA network in a manner consistent with the principles of the present invention.
Figure 2B:
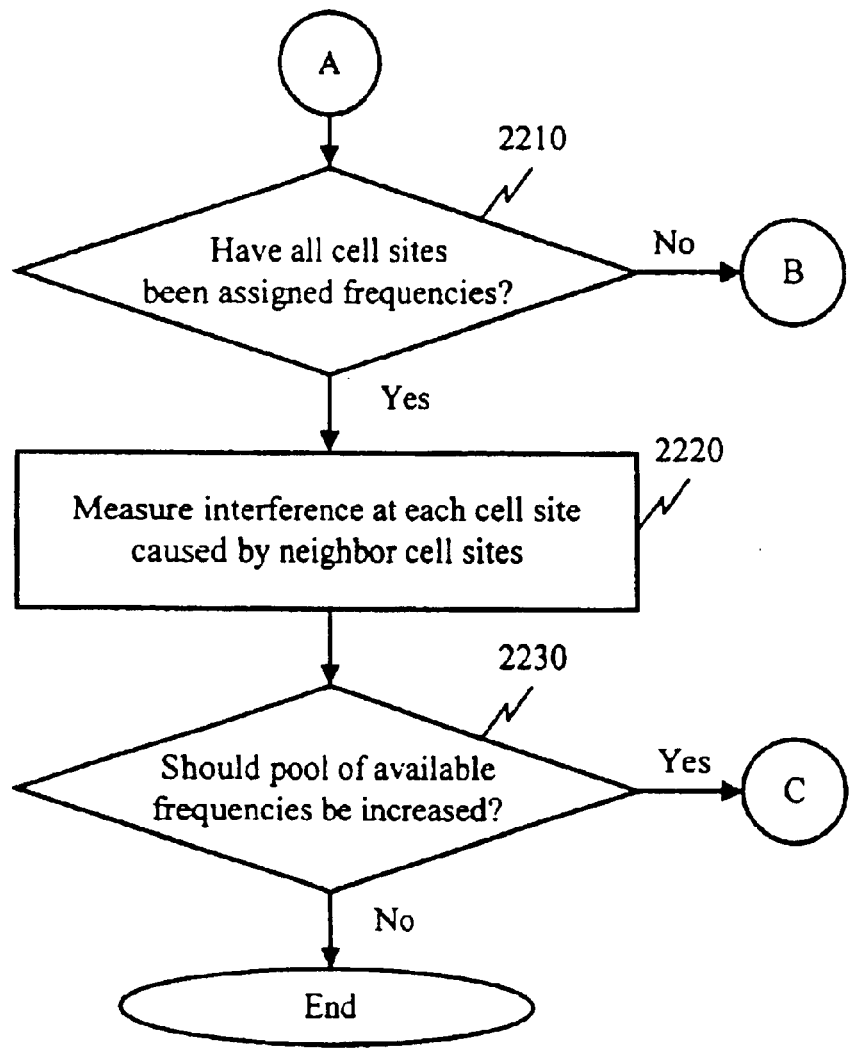

FIGS. 2A and 2B are a flowchart of a method of increasing the capacity of a CDMA network in a manner consistent with the principles of the present invention. The method is executed by a computer system, such as a personal computer or a larger main frame computer. The computer system operates on a simulated CDMA network to increase its capacity for use in a real CDMA network deployment. While systems and methods consistent with the principles of the present invention will be described as increasing the capacity of a simulated CDMA network for deployment of a real CDMA network, the systems and methods could also be used as a network manager to dynamically update an existing CDMA network.

The computer system begins the method by defining the CDMA network coverage area [step 2110]. Defining the CDMA network coverage area includes identifying the cell sites, including CDMA border and beacon cell sites, spreading CDMA traffic, and setting CDMA parameters. Spreading the CDMA traffic entails designating a traffic map for the network so as to distribute the anticipated CDMA network traffic across the best serving areas of all of the cell sites and sectors. The CDMA parameters include power settings for all of the channels, antenna gain, cable loss, handoff thresholds, etc.

Once the CDMA network coverage area is defined, the pool of available frequencies is defined [step 2120]. The number of frequencies in the frequency pool is user-selected. After the available frequency pool has been defined, the system assigns each cell site a single frequency from the frequency pool. The system does this by selecting a cell site for assignment [step 2130], and determining whether the cell sites neighboring the selected cell site have already been assigned frequencies [step 2140]. If none of the neighbor cell sites have been assigned frequencies, the system assigns a frequency from the frequency pool to the selected cell site [step 2150]. This assignment might be made by randomly selecting a frequency from the pool of available frequencies.

If some of the neighbor cell sites have already been assigned frequencies, the system determines what frequencies have been assigned to these neighbor cell sites [step 2160]. Based on this determination, the number of frequencies available from the frequency pool, the pathloss, the traffic environment, etc., the system assigns a frequency to the selected cell site [step 2170]. The system assigns this frequency so as to minimize the number of neighbor cell sites that are assigned the same frequency.

Once the selected cell site is assigned a frequency, the system determines whether all of the cell sites in the CDMA network have been assigned frequencies [step 2210] (FIG. 2B). If some of the cell sites have not been assigned frequencies, the system returns to step 2130 where it selects the next cell site for frequency assignment. If all of the cell sites have been assigned frequencies, however, the system measures the amount of interference occurring at each cell site caused by neighbor cell sites that operate at the same frequency [step 2220].

Based on whether the amount of interference caused by neighbor cell sites is acceptable, maybe based on comparison to a predetermined threshold, the system determines whether the pool of available frequencies should be increased [step 2230]. If the frequency pool should be increased, the system returns to step 2120 where the user redefines the pool of available frequencies. If the frequency pool is not to be increased, the frequency assignment is determined to be acceptable and the method ends.

Figure 3:
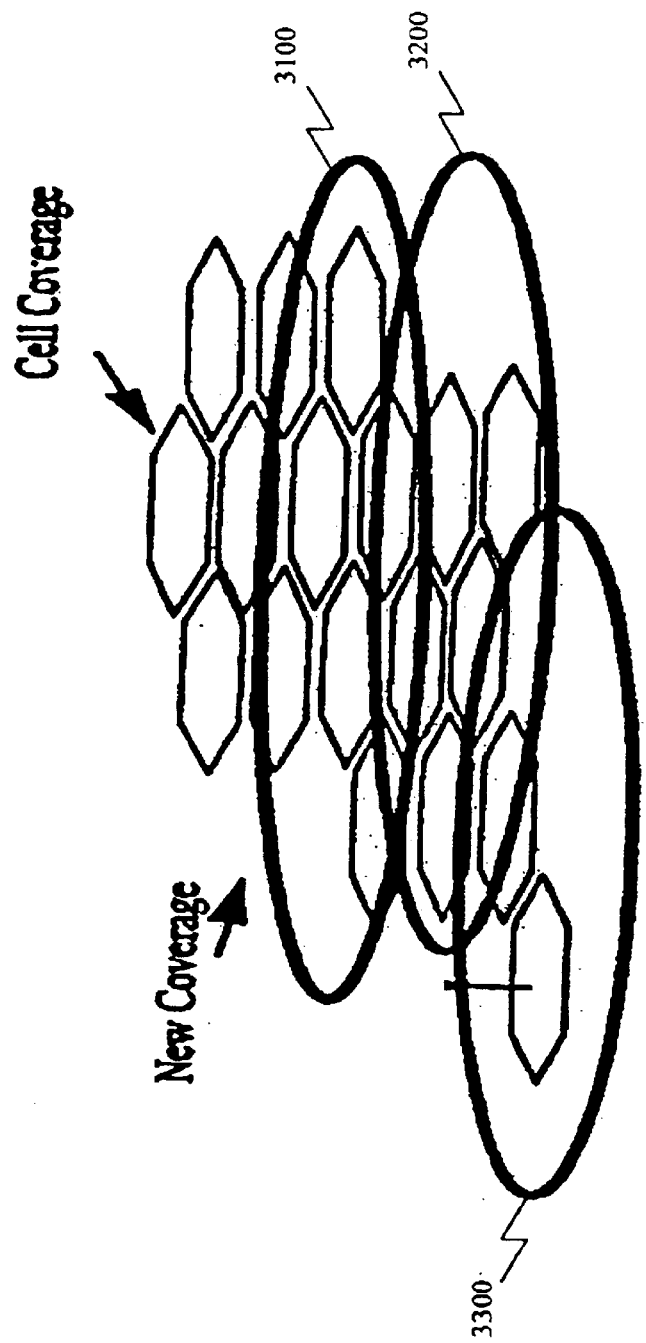
FIG. 3 is a diagram of an extension of effective cell site coverage occurring as a result of deploying different frequencies in a manner consistent with the principles of the present invention.

By using different frequencies in a manner consistent with the principles of the present invention, the effective coverage of a cell site can be extended. FIG. 3 is a diagram of the extension of effective coverage occurring as a result of deploying different frequencies consistent with the principles of the present invention. The larger "discs" 3100, 3200, and 3300 represent cell sites operating at similar frequencies.

Figure 4:
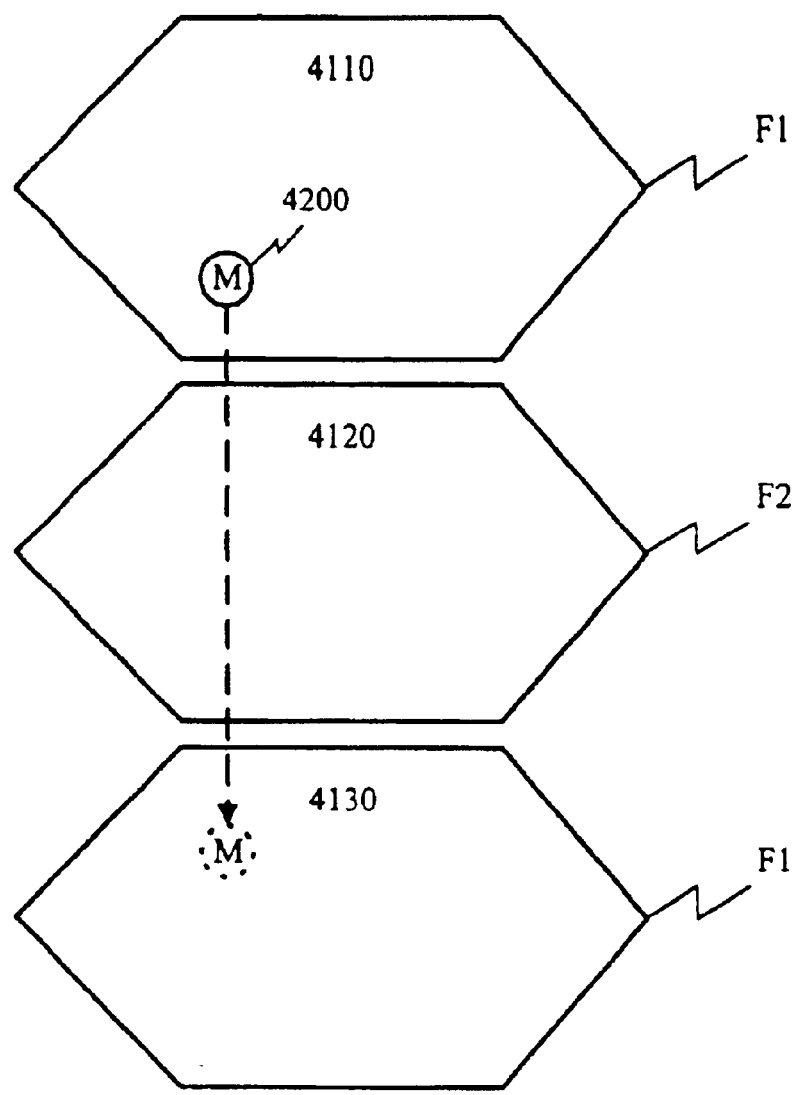
FIG. 4 is a diagram showing an example in which a mobile or portable unit moves between cell sites operating at different frequencies.

The frequency and placement, according to principles of the present invention, are such that hard handoff mechanisms are used to traverse between cell sites. FIG. 4 is a diagram showing an example in which a mobile or portable unit moves between cell sites operating at different frequencies. FIG. 4 shows three cell sites 4110, 4120, and 4130, and mobile unit 4200 originally located in cell site 4110. Cell sites 4110 and 4130 operate at frequency F1. Cell site 4120, located between cell sites 4110 and 4130, operates at frequency F2.

As mobile unit 4200 traverses cell site 4120 on its way to cell site 4130, one of two things can occur. If the signals from cell sites 4110 and 4130 are sufficiently strong, mobile unit 4200 performs a soft handoff from frequency F1 used by cell site 4110 to frequency F1 used by cell site 4130 without having to perform a hard handoff to frequency F2 used by cell site 4120. If, however, the signals from cell sites 4110 and 4130 are not strong, mobile unit 4200 performs a hard handoff from frequency F1 used by cell site 4110 to frequency F2 used by cell site 4120. If this occurs, mobile unit 4200 also performs a hard handoff to frequency F1 used by cell site 4130 after mobile unit 4200 enters cell site 4130.

Thus, a mobile or portable unit traversing the network can perform a soft handoff between cell sites operating at the same frequency or a hard handoff to a neighboring cell site operating at a different frequency.

Figure 1:
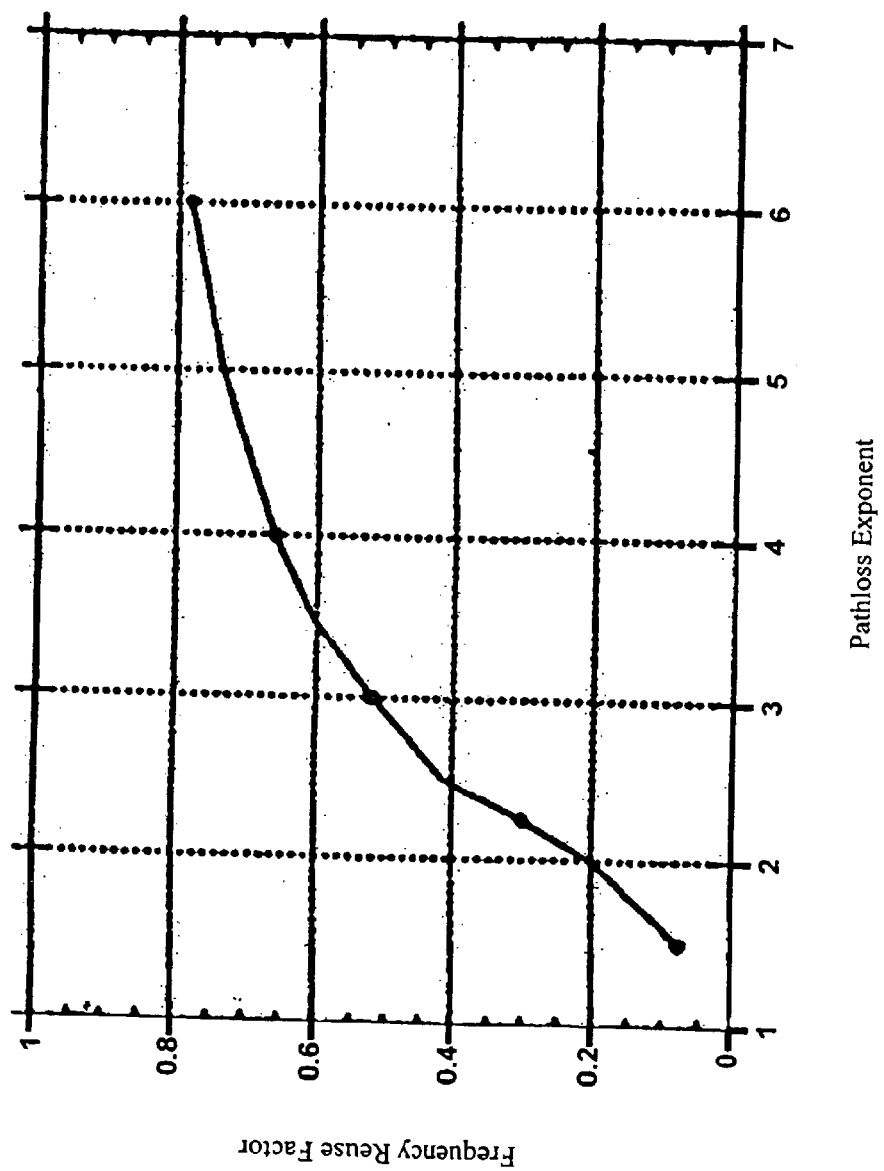
FIG. 1 is a graph of the frequency reuse factor as a function of the pathloss exponent obtained by considering a hexagonal arrangement of cell sites in a CDMA network deployed at a single frequency.
Figure 5:
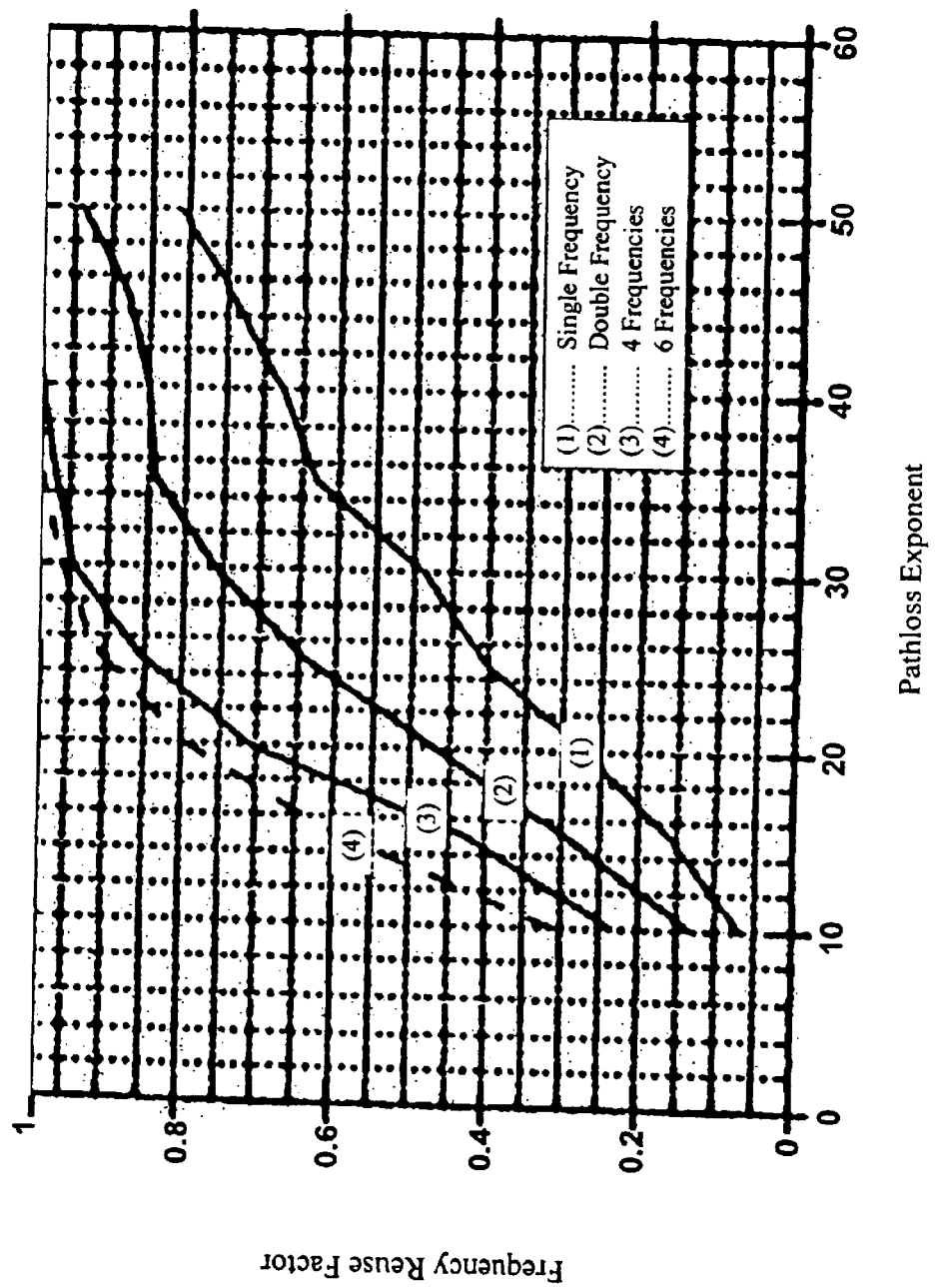
FIG. 5 is a graph of the frequency reuse factor as a function of the pathloss exponent and the number of deployed frequencies in a CDMA network consistent with the principles of the present invention.

By increasing the pool of frequencies available for assignment, as described above, the amount of interference between cell sites reduces and the capacity on the deployed frequencies increases. FIG. 5 is a graph of the frequency reuse factor as a function of the pathloss exponent and the number of deployed frequencies in a CDMA network consistent with the principles of the present invention. Line 1 represents a frequency pool including a single frequency, similar to the graph shown in FIG. 1, line 2 represents a frequency pool having two frequencies, line 3 represents a frequency pool having four frequencies, and line 4 represents a frequency pool including six frequencies.

When a single frequency is deployed (line 1), the frequency reuse factor for a low pathloss exponent of 2, for example, can be as low as 20 to 30%, depending on shadowing and the specific handoff parameter settings. This means that most of the potentially usable signal at the base station receiver is actually interference from mobile units in other cell sites rather than signals from within the same cell site. By doubling the frequency pool (line 2), the cell site capacity increases by approximately 75% for a pathloss exponent of 2. Further increasing the frequency pool to four (line 3) or six (line 4) frequencies increases the cell site capacity for a pathloss exponent of 2 by approximately 180 to 220%, respectively.

The benefits may not be as dramatic at higher pathloss exponent values. For example, for a pathloss exponent of 4, the frequency reuse factor for a single deployed frequency is approximately 65 to 70%. When two, four, or six frequencies are deployed, the cell site capacity increases by approximately 25 to 45%, respectively.

Figure 6:
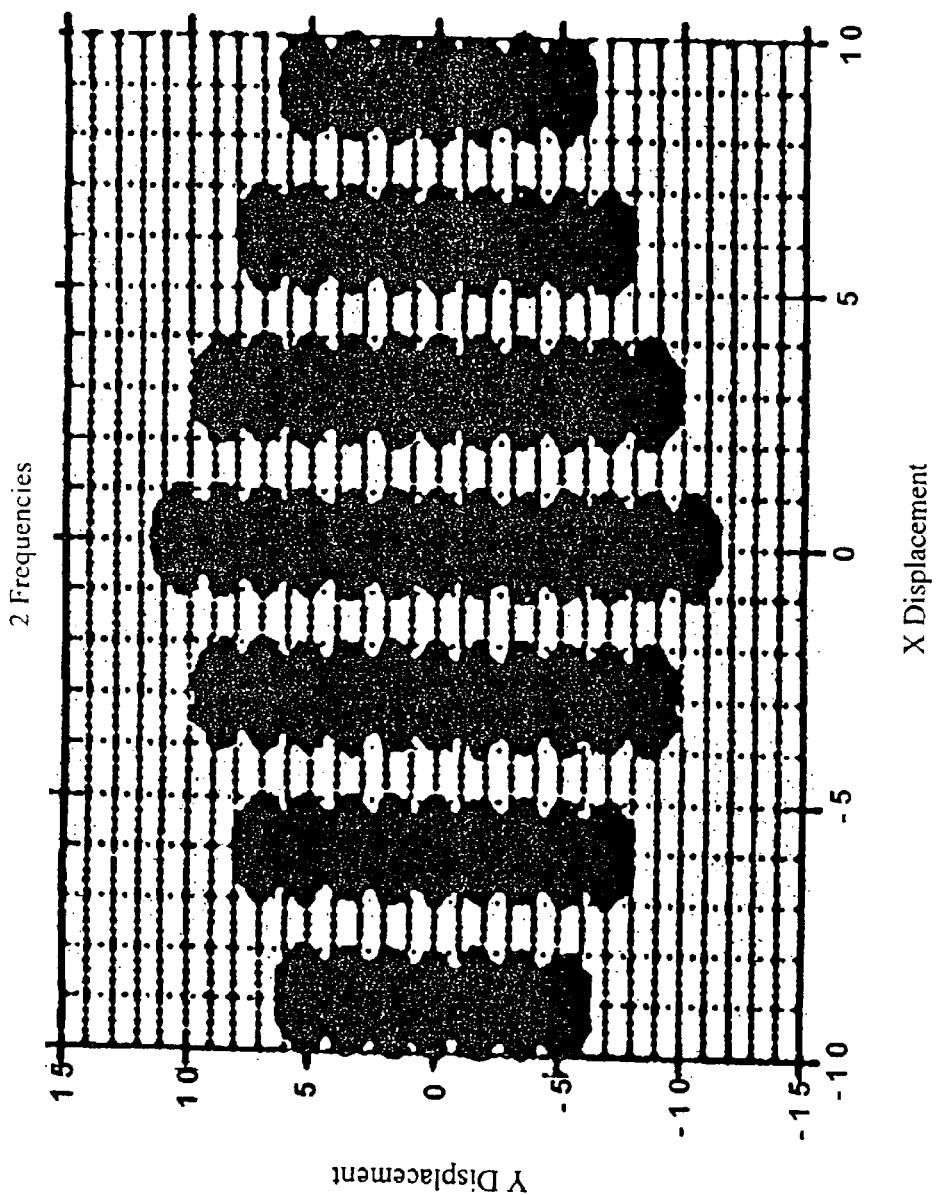
FIG. 6 is a diagram of an example of a frequency plan having two deployed frequencies.
Figure 7:
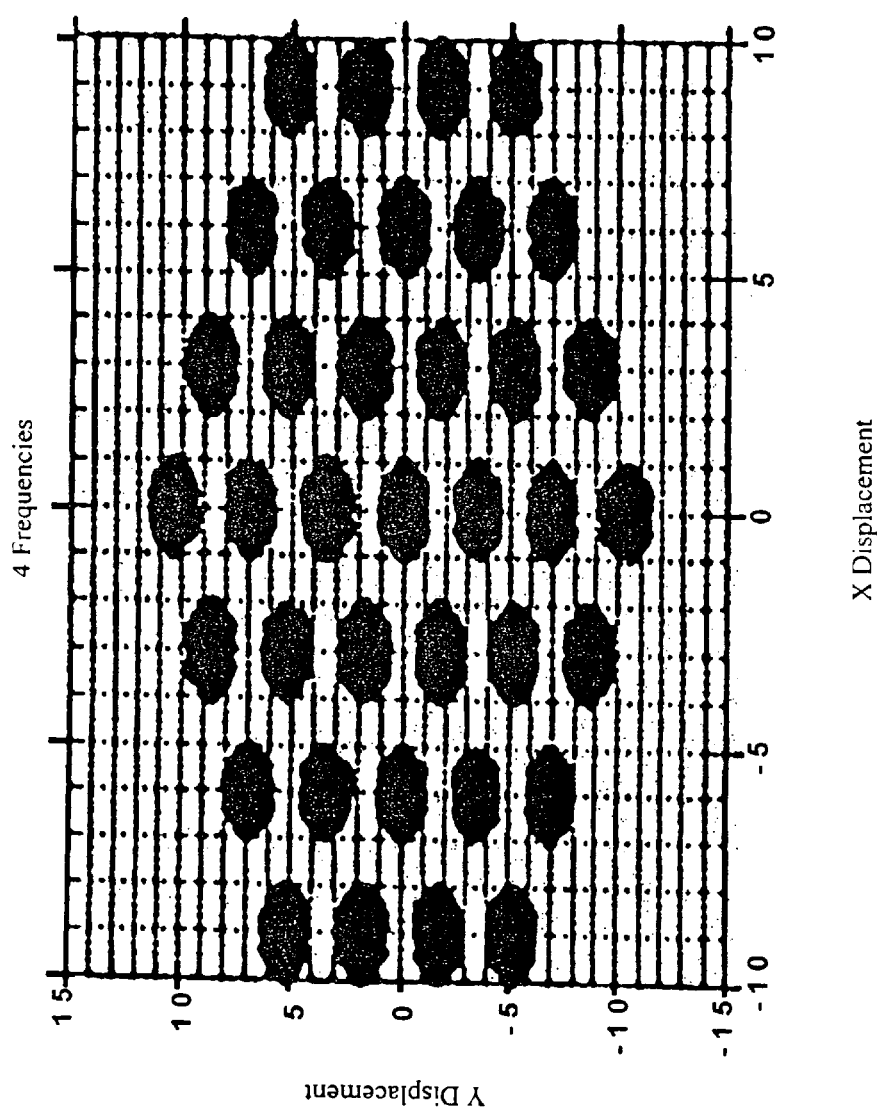
FIG. 7 is a diagram of an example of a frequency plan having four deployed frequencies.
Figure 8:
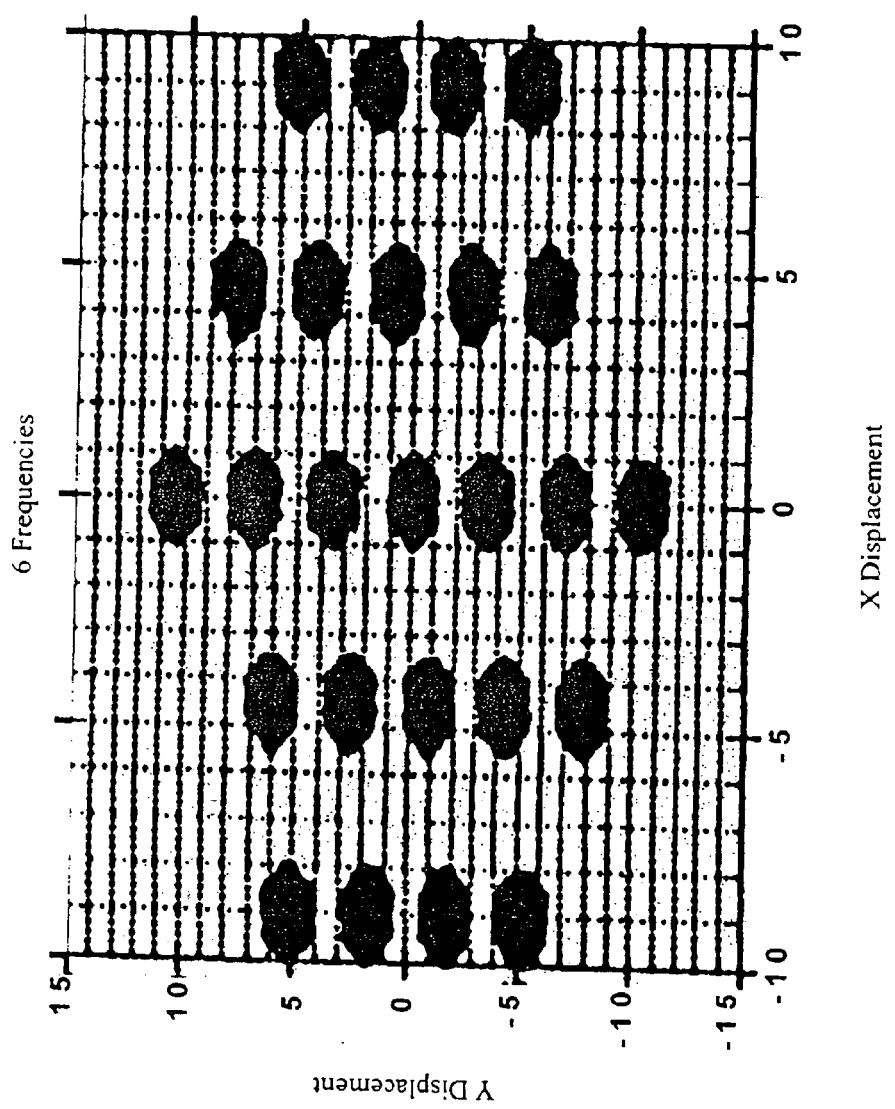
FIG. 8 is a diagram of an example of a frequency plan having six deployed frequencies.

FIGS. 6 through 8 are diagrams of frequency plans having two, four, and six deployed frequencies, respectively. These figures show the hexagonal arrangement of cell sites operating at a similar frequency for two frequencies (FIG. 6), four frequencies (FIG. 7), and six frequencies (FIG. 8).

Systems and methods consistent with the principles of the present invention increase cell site capacity in a CDMA network by deploying multiple frequencies and utilizing hard handoff mechanisms between cell sites.

The systems and methods consistent with the principles of the present invention are applicable to both forward and reverse CDMA channels, and find maximum benefit in microcellular scenarios where the pathloss exponent is low and there is sufficient traffic to warrant the deployment of additional frequencies, and where frequency resources are not an issue, such as at Personal Communications Services (PCS) frequencies.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

What is claimed is:

1. A method for increasing capacity of a wireless network having a plurality of cell sites, comprising the steps of:
   defining a pool of available frequencies for assignment;
   assigning an available frequency from the pool of available frequencies to each cell site of the plurality of cell sites, the available frequency assigned to limit neighboring cell sites assigned a same frequency as the available frequency;
   determining signal quality parameters associated with at least one cell site of the plurality of cell sites; and
   modifying the pool of available frequencies for assignment based on the determined signal quality parameters associated with the at least one cell site.

2. A system for increasing capacity of a wireless network having a plurality of cell sites, comprising:
   a frequency defining component to define a pool of available frequencies for assignment;
   an assignment component to assign an available frequency from the pool of available frequencies to each cell site of the plurality of cell sites, the available frequency assigned to limit neighboring cell sites assigned a same frequency as the available frequency;
   a determination component to determine signal quality parameters associated with at least one cell site of the plurality of cell sites; and
   a frequency component to modify the pool of available frequencies for assignment based on the determined signal quality parameters associated with the at least one cell site.

3. The system of claim 2, wherein the assignment component includes:
   a selection component to select one of the cell sites,
   a determination component to determine frequencies assigned to the cell sites neighboring the selected cell site, and
   a frequency assignment component to assign one of the available frequencies to the selected cell site based on the determined frequencies assigned to the neighboring cell sites.

4. A computer program product for increasing capacity of a wireless network having a plurality of cell sites, comprising:
   a frequency defining module to define a pool of available frequencies for assignment;
   an assignment module to assign an available frequency from the pool of available frequencies to each cell site of the plurality of cell sites, the available frequency to limit neighboring cell sites assigned a same frequency as the available frequency;
   a determination module to determine signal quality parameters associated with at least one cell site of the plurality of cell sites; and a frequency module to modify the pool of available frequencies for assignment based on the determined signal quality parameters associated with the at least one cell site.

5. A method of increasing capacity of a wireless network, comprising the steps of:
- identifying cell sites of the wireless network;
- defining a pool of available frequencies for assignment;
- selecting one of the cell sites;
- determining frequencies assigned to the cell sites neighboring the selected cell site to provide determined frequencies;
- assigning one of the available frequencies to the selected cell site based on the determined frequencies to limit a number of neighboring cell sites assigned a same one of the available frequencies;
- determining signal quality parameters associated with at least one cell site of the plurality of cell sites; and
- modifying the pool of available frequencies for assignment based on the determined signal quality parameters associated with the at least one cell site.

6. A method for increasing capacity of a wireless network having a plurality of cell sites, comprising the steps of:
- assigning an available frequency from a pool of available frequencies to each cell site of the plurality of cell sites;
- increasing the pool of available frequencies for assignment to reduce an amount of interference at at least one cell site of the plurality of cell sites; and
- assigning the increased pool of available frequencies to the cell sites to limit the number of neighboring cell sites assigned the same one of the available frequencies.

7. A system for increasing capacity of a wireless network having a plurality of cell sites, comprising:
- a frequency defining component to define a pool of available frequencies for assignment;
- an assignment component to assign an available frequency from the pool of available frequencies to each cell site of the plurality of cell sites;
- a frequency component to increase the pool of available frequencies for assignment to reduce an amount of interference at at least one cell site of the plurality of cell sites; and
- a frequency assignment component to assign the increased pool of available frequencies to the cell sites to limit the number of neighboring cell sites assigned the same one of the available frequencies.

8. A computer program product for increasing capacity of a wireless network having a plurality of cell sites, comprising:
- a frequency defining module to define a pool of available frequencies for assignment;
- an assignment module to assign an available frequency from the pool of available frequencies to each cell site of the plurality of cell sites;
- a frequency module to increase the pool of available frequencies for assignment to reduce an amount of interference at at least one cell site of the plurality of cell sites; and
- a frequency assignment module to assign the increased pool of available frequencies to the cell sites to limit the number of neighboring cell sites assigned the same one of the available frequencies.

9. A method for increasing capacity of a wireless network having a plurality of cell sites, comprising the steps of:
- assigning an available frequency from a pool of available frequencies to each cell site of the plurality of cell sites;
- determining an amount of interference at at least one cell site of the plurality of cell sites;
- modifying the pool of available frequencies for assignment based on the determined amount of interference; and
- assigning the modified pool of available frequencies to the cell sites to limit the number of neighboring cell sites assigned the same one of the available frequencies.

10. A system for increasing capacity of a wireless network having a plurality of cell sites, comprising:
- an assignment component to assign an available frequency from a pool of available frequencies to each cell site of the plurality of cell sites;
- a determination component to determine an amount of interference at at least one cell site of the plurality of cell sites;
- a frequency component to modify the pool of available frequencies for assignment based on the determined amount of interference; and
- a frequency assignment component to assign the modified pool of available frequencies to the cell sites to limit the number of neighboring cell sites assigned the same one of the available frequencies.

11. A computer program product for increasing capacity of a wireless network having a plurality of cell sites, comprising:
- an assignment module to assign an available frequency from a pool of available frequencies to each cell site of the plurality of cell sites;
- a determination module to determine an amount of interference at at least one cell site of the plurality cell sites;
- a frequency module to modify the pool of available frequencies for assignment based on the determined amount of interference; and
- a frequency assignment module to assign the modified pool of available frequencies to the cell sites to limit the number of neighboring cell sites assigned the same one of the available frequencies.

* * * * *